(12) United States Patent
Hessabi

(10) Patent No.: US 6,789,362 B1
(45) Date of Patent: Sep. 14, 2004

(54) THERMALLY CONTROLLED WINDOW TINTING

(76) Inventor: Iradj Hessabi, 12007 Oakland Hills Dr., Las Vegas, NV (US) 89141

( * ) Notice: Subject to any disclaimer, the term of this patent is extended or adjusted under 35 U.S.C. 154(b) by 0 days.

(21) Appl. No.: 10/352,553

(22) Filed: Jan. 29, 2003

(51) Int. Cl.[7] ................................................. E06B 7/00
(52) U.S. Cl. ...................... 52/171.3; 359/272; 359/361; 359/601
(58) Field of Search ........................... 52/171.3, 786.11; 359/275, 272, 361, 601, 609, 265

(56) References Cited

U.S. PATENT DOCUMENTS

| | | | | |
|---|---|---|---|---|
| 3,695,681 A | * | 10/1972 | Dockery | 296/96.19 |
| 5,197,242 A | * | 3/1993 | Baughman et al. | 52/171.3 |
| 5,587,828 A | * | 12/1996 | Bernard, Jr. | 359/275 |
| 5,657,607 A | * | 8/1997 | Collins et al. | 52/786.13 |
| 5,781,343 A | * | 7/1998 | Cook | 359/608 |
| 5,793,544 A | * | 8/1998 | Ogihara et al. | 359/885 |
| 5,940,216 A | * | 8/1999 | Gibbs | 359/601 |
| 6,094,290 A | * | 7/2000 | Crawford et al. | 359/241 |
| 6,216,688 B1 | * | 4/2001 | Schwarz | 126/633 |
| 6,457,286 B1 | * | 10/2002 | Eliyahu et al. | 52/171.3 |
| 6,536,828 B2 | * | 3/2003 | Love et al. | 296/96.19 |
| 6,580,472 B1 | * | 6/2003 | Willingham et al. | 349/16 |
| 6,581,342 B1 | * | 6/2003 | Tavivian | 52/204.595 |
| 6,594,957 B1 | * | 7/2003 | Milburn | 52/22 |
| 2003/0150174 A1 | * | 8/2003 | Kim | 52/171.3 |

* cited by examiner

*Primary Examiner*—Leslie Braun
*Assistant Examiner*—Amy J Sterling
(74) *Attorney, Agent, or Firm*—Leonard Weiss

(57) ABSTRACT

A window is made from similar panes of glass that have a space therebetween. Side edges of the panes are sealed. Top and bottom edges of the panes form a top slot and a bottom slot, respectively. The top slot is disposed within a top well that is connected through passageways to a pair of top air chambers that each have a heater therein. When an aqueous solution is in the top well and the top chambers are heated, the aqueous solution is forced through the top slot the space between the panes. The bottom slot is disposed within a bottom well that is connected through passageways to a pair of bottom air chambers that each have a heater therein. When the aqueous solution is in the bottom well and the bottom chambers are heated, the aqueous solution is forced through the bottom slot the space between the panes.

6 Claims, 2 Drawing Sheets

THERMALLY CONTROLLED WINDOW TINTING

BACKGROUND OF THE INVENTION

1. Field of Invention

This invention is in the general field of environmental temperature control and, more particularly, is for inhibiting environmental solar heat and light.

2. Description of the Prior Art

When an automobile is driven along a highway during daylight hours, rays of sunlight often interfere with a driver's vision of the highway and other automobiles on the highway. The driver shields his eyes from the rays of sunlight by positioning a visor that is connected to the interior of the automobile, above the windshield of the automobile. A disadvantage of the visor is that it prevents vision through a substantial portion of the windshield.

The present invention utilizes well known compression characteristics of a liquid, such as an aqueous solution, and a gas, such as air, to tint a window. Simply put, the aqueous solution is virtually incompressible, whereas air is compressible. Moreover, when air is heated within a container, pressure exerted by the air upon walls of the container increases because the heating causes the air to be compressed.

Heretofore, compression characteristics of the liquid and the gas have not been used for window tinting.

SUMMARY OF THE INVENTION

An object of the present invention is to restrict a transmission of light through a window.

According to the present invention, an air-tight system includes a window made from similar first and second panes of glass. A surface of the first plane of glass and a surface of the second plane of glass have a space therebetween. Slots formed by top and bottom edges of the panes are passageways into the space. The top and bottom slots are within a top well and a bottom well, respectively. The top well is connected through a passageway to a top air chamber. The bottom well is connected though a passageway to a bottom air chamber. In response to the top chamber being heated, air therein becomes compressed. An aqueous solution in the top well is forced by the air in the top chamber through the top slot into the space. In response to the bottom chamber being heated, air therein becomes compressed. An aqueous solution in the bottom well is forced by the air in the bottom chamber through the bottom slot into the space.

The present invention is especially suitable for reducing an amount of sunlight transmitted through a window of an automobile, thereby increasing comfort of a driver and passengers within the automobile.

Other objects, features and advantages of the invention should be apparent from the following description of the preferred embodiment as illustrated in the accompanying drawing.

DESCRIPTION OF THE PREFERRED EMBODIMENT

Figures 1, 2:
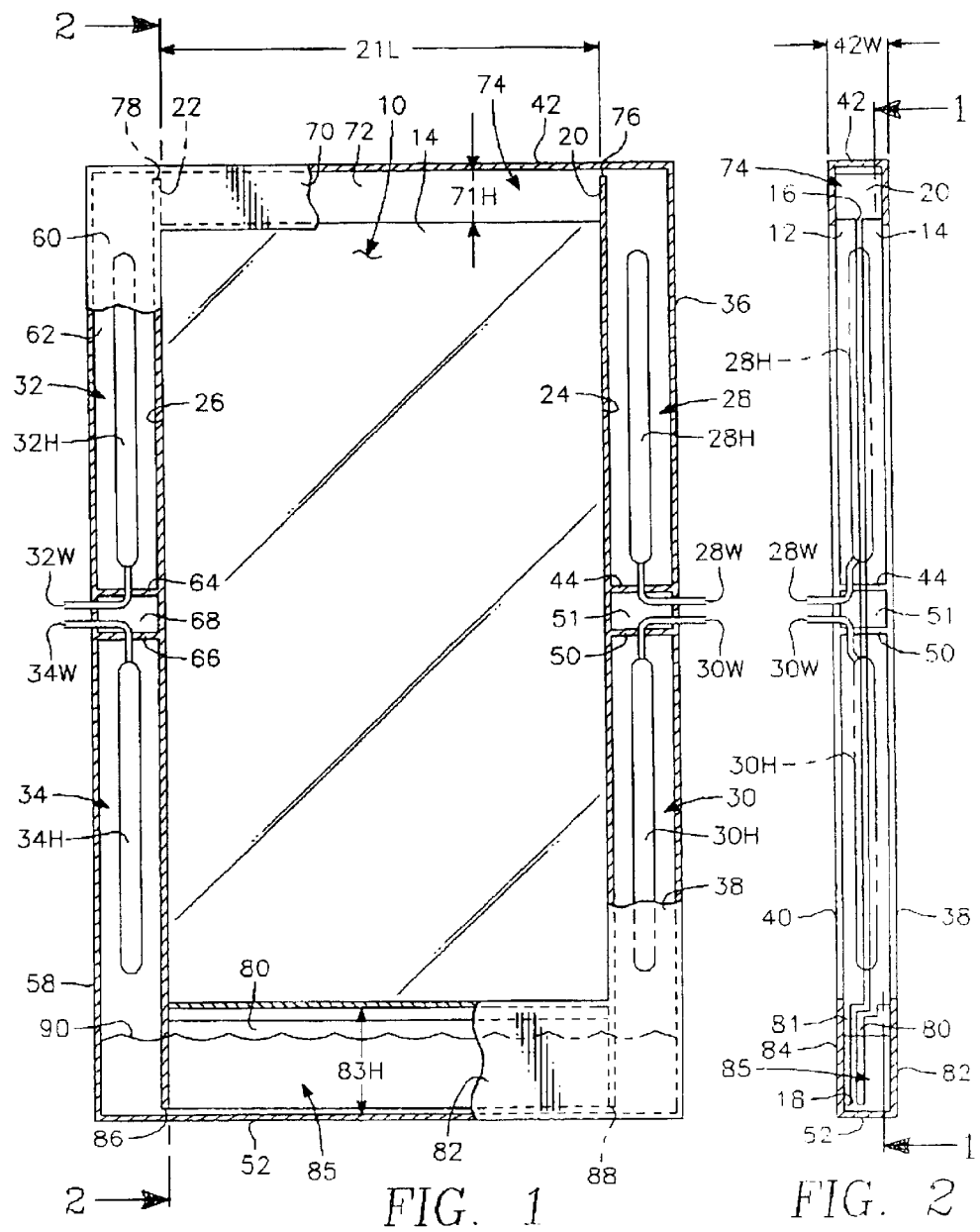
FIG. 1 is a section of the preferred embodiment of the invention taken along the line 1—1 of FIG. 2 when an aqueous solution submerges a slot along a bottom edge of two closely spaced parallel panes of glass.
FIG. 2 is a section of FIG. 1 taken along the line 2—2 of FIG. 1.

Shown in FIGS. 1 and 2 is a window 10 (FIG. 1) of an automobile. The window 10 includes similar rectangular panes 12, 14 (FIG. 2) connected together by air-tight strips 20, 22 (FIG. 1) that seal side edges 24, 26, respectively, of the window 10. The strips 20, 22 maintain surfaces of the panes 12,14 parallel with a space therebetween. A top slot 16 and a bottom slot 18 are formed by top edges and bottom edges, respectively, of the panes 12,14. The slots 16, 18 are passageways into the space.

As explained hereinafter, one side of the window 10 is connected to a top air chamber 28 and a bottom air chamber 30. The other side of the window 10 is connected to a top air chamber 32 and a bottom air chamber 34.

The chamber 28 has four side walls. The strip 20 forms a first of the side walls of the chamber 28 Opposite from the strip 20, an air-tight wall 36 forms a second of the side walls of the chamber 28. The other two sides of the chamber 28 are air-tight side walls 38, 40 (FIG. 2) that are opposite each other and connected to the strip 20 and the wall 36. The walls 38, 40 are perpendicular to the strip 20 and the wall 36 whereby the chamber 28 is substantially a rectangular enclosure.

A top and a bottom of the chamber 28 are formed from air-tight walls 42, 44, respectively. The wall 42 is connected to the walls 36, 38, 40. The wall 44 is connected to the walls 36, 38, 40 and the strip 20.

Similar to the chamber 28, side walls of the chamber 30 include the strip 20 and the walls 36, 38, 40. A top and a bottom of the chamber 30 are formed from air-tight walls 50, 52, respectively. The wall 50 is connected to the walls 36, 38, 40 and the strip 20. The wall 52 is connected to the walls 36, 38, 40.

As explained hereinafter, the chambers 28, 30 are selectively heated. The walls 44, 50 are parallel with a separation therebetween that creates a dead air pocket 51 that provides a thermal insulation between the chambers 28, 30.

Similar heater elements 28H, 30H are mounted within the chambers 28, 30, respectively. The heater 28H is connected to wires 28W that pass through the walls 40, 44, through a heater 28H switch (not shown), to a controllable source of electrical power (not shown). It should be understood that the wires 28W pass through the wall 44 in a manner that maintains the wall 44 air-tight.

When the heater 28H switch is ON, the power source is operable to cause the heater 28H to heat air in the chamber 28. Electrical power sources and switches are well known to those skilled in the art.

In a similar manner, the heater 30H is connected to wires 30W that pass through the walls 40, 44, through a heater 30H switch (not shown), to the electrical power source. When the heater 30H switch is ON, the power source is operable to cause the heater 30H to heat air in the chamber 30.

Like the chamber 28, the chamber 32 has four side walls. The strip 22 forms a first of the side walls of the chamber 32. Opposite from the strip 22, an air-tight wall 58 (FIG. 1) forms a second of the side walls of the chamber 32. The other two sides of the chamber 32 are air-tight side walls 60, 62 that are connected to the strip 22 and the wall 58. The side walls 60, 62 are perpendicular to the strip 22 and the wall 58 whereby the chamber 32 is substantially a rectangular enclosure.

A top of the chamber 32 is further enclosed by the wall 42. A bottom of the chamber 32 is an air-tight wall 64. The wall 42 is connected to the walls 58, 60, 62. The wall 64 is connected to the walls 56, 60, 62 and the strip 22.

Similar to the chamber 32, side walls of the chamber 34 include the strip 22 and the walls 58, 60, 62. A top of the chamber 34 is an air-tight wall 66. A bottom of the chamber 34 is formed from the wall 52 The wall 66 is connected to the walls 56, 60, 62 and the strip 22. The wall 52 is connected to the walls 56, 60, 62.

As explained hereinafter, the chambers 32, 34 are selectively heated. The walls 64, 66 are parallel with a separation therebetween that creates a dead air pocket 68 that provides a thermal insulation between the chambers 32, 34.

Heater elements 32H, 34H, similar to the elements 28H, 30H, are mounted within the chambers 32, 34, respectively. The heater 32H is connected to wires 32W that pass through the walls 58, 64, through a heater 32H switch (not shown)to the power source. When the 32H switch is ON, the electrical power source is operable to cause the heater 32H to heat air in the chamber 32.

Similarly, the heater 34H is connected to wires 34W that pass through the walls 58, 66, through a heater 34H switch (not shown)to the power source. When the 34H switch is ON, the electrical power source is operable to cause the heater 34H to heat air in the chamber 34.

An air-tight wall 70 is contiguously connected to the walls 40, 60. Additionally, the wall 70 is connected to the pane 14 proximal to the slot 16 and to the wall 42.

Similarly, an air tight wall 72 is contiguously connected to the walls 38, 62. Additionally, the wall 72 is connected to the pane 12 proximal to the slot 16 and to the wall 42.

An upper well 74 is formed by the strips 20, 22, the walls 42, 70, 72 and edges of the panes 12, 14 that form the slot 16. The upper well 74 has a width 42W equal to a width (FIG. 2) of the wall 42, a length 21L (FIG. 1) equal to a displacement between the strips 20, 22 and a height 71H substantially equal to a width of the walls 70, 72.

The strips 20, 22 have ends 76, 78, respectively. There is a separation of the ends 76, 78 from the wall 42. Because of the separation, passageways are provided for air to pass to and from the chambers 28, 32 and the upper well 74.

A lower part 80 (FIG. 2) of the window 10 is narrowed and has a bend 81 to provide an increased space between the pane 14 and the wall 38.

An air-tight wall 82 (FIG. 1) is contiguously connected to the walls 40, 60. The wall 82 is connected to the wall 52. Similarly, an air tight wall 84 is contiguously connected to the walls 38, 62. The wall 84 is connected to the wall 52 and the pane 14 proximal to the bend 81.

The walls 36, 58, 82, 84 form a lower well 85 having a width equal to the width 42W, a length equal to a displacement between the walls 36, 58 and height 83H equal to a width of the walls 82, 84. Because of the narrowing of the window 10 in the lower part 80, the lower well 85 has an increased volume.

The strips 20, 22 have ends 86, 88, respectively. There is a separation of the ends 86, 88 from the wall 52. Because of the separation from the wall 52, passageways are provided between the lower well 85 and the chambers 30, 34.

It should be understood that the wells 74, 85, the panes 12, 14, and the chambers 28, 30, 32, 34 are an air-tight system. As explained hereinafter, an aqueous solution is moved within the system into and out of the space between the panes 12, 14 in response to heating of the chambers 28, 30, 32, 34.

A colored aqueous solution 90 is in the lower well 85. In response to the power source causing the heaters 30H, 34H, to heat the chambers 30, 34 , air therein is compressed, thereby forcing the solution 90 through the passageways between the ends 86, 88 and the wall 52 and through the slot 18 into the space between the panes 12, 14. Some of the solution 90 may flow through the slot 16 into the upper well 74 (FIG. 3).

Because the solution 90 is colored, the window 10 is tinted when the solution 90 is within the space between the panes 12, 14. Preferably, the electrical power source is controllable to cause the solution 90 to remain within the space between the panes 12, 14.

Figure 3:
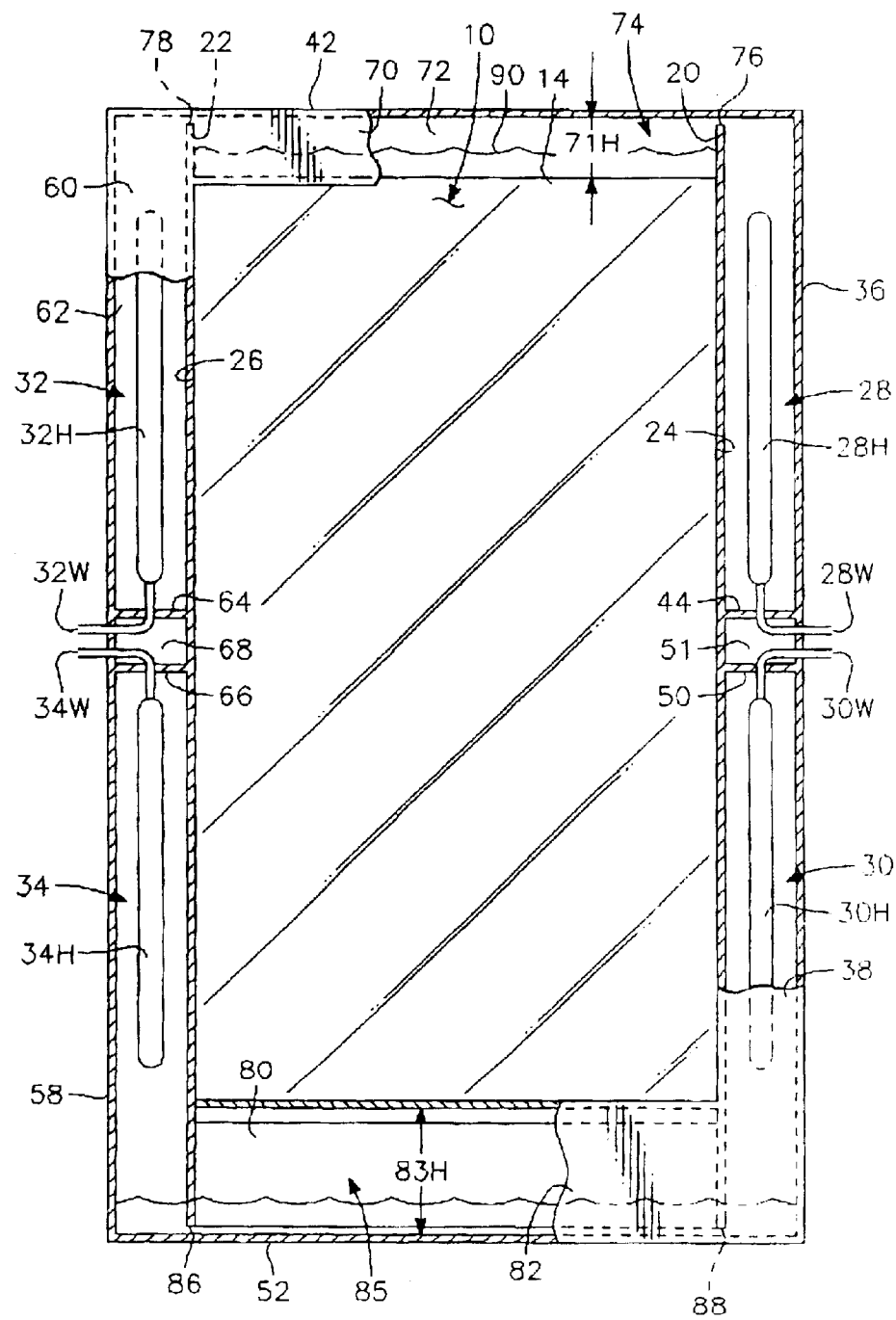
FIG. 3 is a view of FIG. 1 when the aqueous solution submerges a slot along a top edge of the panes.

FIG. 3 is a showing of the solution 90 in the upper well 74 and within the space between the panes 12, 14. When it is desired to have the tinting of the window 10 removed, the power source causes the heaters 28H, 32H to heat the chambers 30, 34 and compress the air therein. Compressed air from the chambers 30, 34 flows through the passageways formed by the ends 76, 78 and the wall 42 into the upper well 74 and forces the solution 90 through the slot 16, through the space between the panes 12, 14 and through the slot 18 into the lower well 85.

While the invention has been shown and described with reference to a preferred embodiment thereof, it should be understood by those skilled in the art that changes in form and detail may be made therein without departing from the spirit and scope of the invention.

I claim:

1. A window with thermally controlled tinting, comprising:

similar first and second panes of glass positioned with a surface of said first pane and a surface of said second pane having a space therebetween, a top slot and a bottom slot being formed by top and bottom edges, respectively, of said panes;

air-tight strips that seal side edges of said panes;

a top well and a bottom well wherein said top and bottom slots, respectively, are disposed;

a top air chamber connected through a passageway to said top well;

a bottom air chamber connected through a passageway to said bottom well;

means for compressing air in said top chamber to cause an aqueous solution in said top well to flow through said top slot into said space between said panes; and means for compressing air in said bottom chamber to cause an aqueous solution in said bottom well to flow through said bottom slot into said space between said panes.

2. The window with thermally controlled tinting of claim 1 wherein said means for compressing air in said top chamber is a heater disposed within said top chamber.

3. The window with thermally controlled tinting of claim 1 wherein said means for compressing air in said bottom chamber is a heater disposed within said bottom chamber.

4. The window with thermally controlled tinting of claim 1 additionally comprising means for providing a thermal insulation between said top and bottom chambers.

5. The window with thermally controlled tinting of claim 4 wherein said thermal insulating means is a dead air pocket between said top and bottom chambers.

6. The window with thermally controlled tinting of claim 1 wherein said means for compressing air in said top chamber said means for compressing air in said bottom chamber are controllable to cause said aqueous solution to remain in said space between said panes.

\* \* \* \* \*